Jan. 3, 1950
P. E. HAWKINSON
2,493,289
BUFFING STAND
Filed Nov. 25, 1946
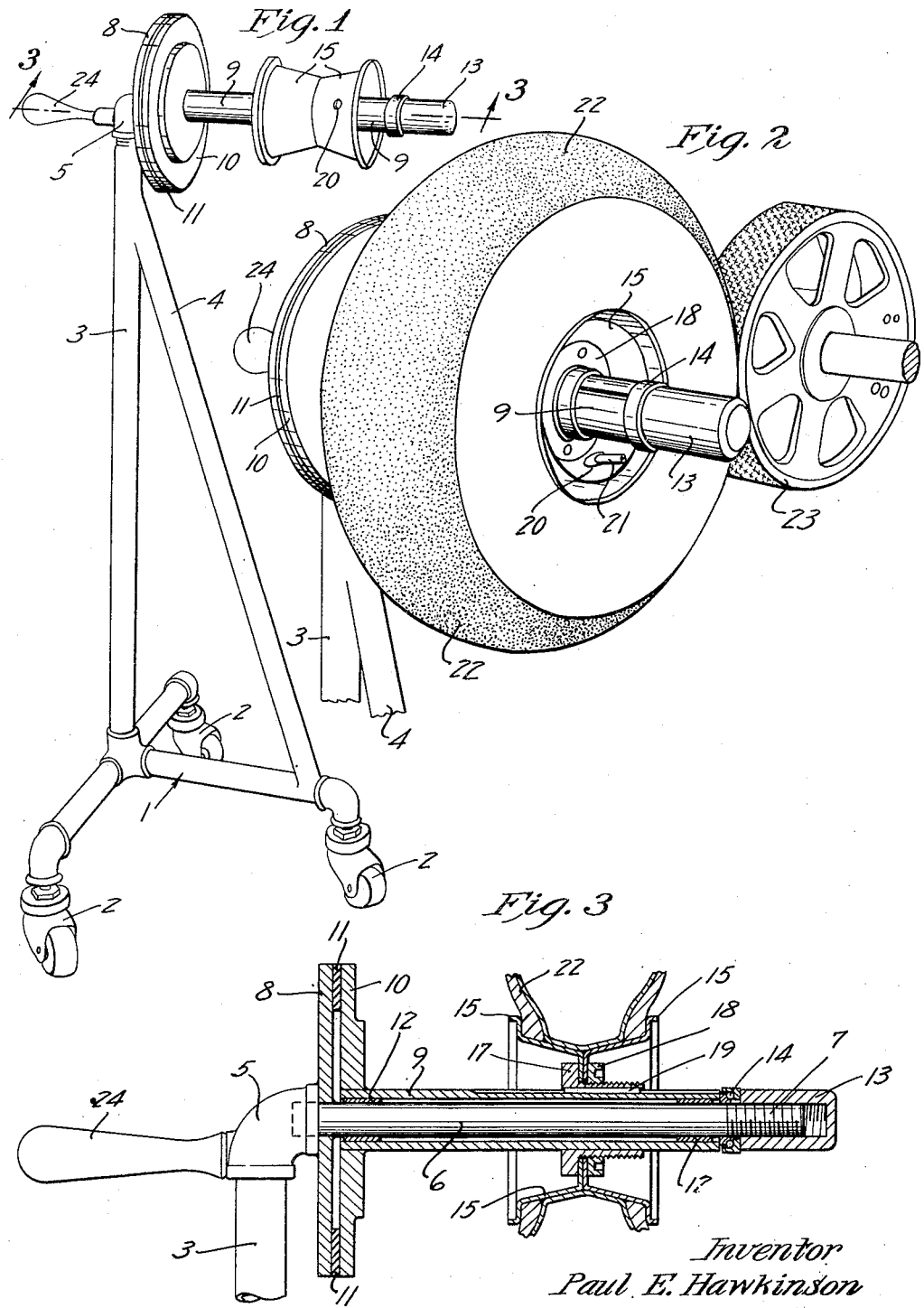
Inventor
Paul E. Hawkinson
By his Attorneys
Merchant & Merchant Patented Jan. 3, 1950

2,493,289

UNITED STATES PATENT OFFICE 2,493,289

BUFFING STAND

Paul E. Hawkinson, Minneapolis, Minn., assignor to Paul E. Hawkinson Company, Minneapolis, Minn., a corporation of Minnesota Application November 25, 1946, Serial No. 712,055

1 Claim. (Cl. 144—288)

My invention relates to tire buffing or abrading machines and particularly to such machines constructed and arranged to buff or finish a pneumatic tire in connection with a treading operation.

The primary object of my invention is the provision of light, inexpensive, and easily mobile apparatus for mounting the tire for the buffing operation.

Another object of my invention is the provision of novel cooperating handle and braking mechanism, whereby the movements of the tire and the rotation of the same may be easily and quickly controlled by the operator.

The above and still further objects of my invention will become apparent from the following detailed specification, appended claims, and attached drawings.

Referring to the drawings wherein like characters indicate like parts throughout the several views:

Fig. 1 is a perspective view of my novel device;

Fig. 2 is an enlarged fragmentary perspective view of my device with a pneumatic tire mounted thereon and also showing a conventional buffing wheel; and Fig. 3 is a view partly in section and partly in side elevation on the line 3—3 of Fig. 1, some parts being broken away.

Referring with greater particularity to the drawings, the numeral 1 indicates, in its entirety, a T-shaped base mounted on rollers or casters 2 to facilitate mobility. Upstanding from base 1 is a supporting post or pedestal 3 reinforced by an angular member 4. Members 1, 3, and 4 may be formed in any suitable manner, but preferably, and as shown, are formed of conventional tubular pipe suitably joined, either by welding or by the use of standard fittings. At its extreme upper end, supporting post or pedestal 3 is provided with a pipe elbow 5 which is rigidly secured thereto. Projecting laterally from the post 3 and, as shown, made fast to the elbow 5 is a spindle 6 which is threaded at its outer end, as at 7. The spindle 6 is non-rotatable and has secured thereto adjacent the elbow 5 a non-rotary brake element in the form of a disk or plate 8. Mounted for rotation on the spindle 6 is an elongated tubular sleeve 9 to the inner end of which is secured for rotation therewith a rotary brake element in the form of a plate or disk 10. As shown brake lining 11 is interposed between the brake elements 8 and 10 and may be secured to either thereof. Bearings 12 are interposed between the spindle 6 and the sleeve 9 adjacent the ends of the sleeve 9. The spindle 6 projects axially beyond the end of the sleeve 9 and the sleeve is moved axially of the spindle to provide operative engagement between the brake elements 8 and 10 by means of a handle forming screw cap 13 having threaded engagement with the projecting portion 7 of the spindle 6. A thrust being 14 is interposed between the inner end of the cap 13 and the end of the sleeve 9 to prevent accidental rotation of cap 13 by sleeve 9.

A work piece holder, in this instance, a tire supporting wheel, is made up of two opposed, identical cup-shaped elements 15. Elements 15 have inwardly extending flanges 16 which are clamped to a collar 17 by means of an annular clamping nut 18. The collar 17 is preferably keyed to the sleeve 9, as at 19.

One or both of the cup-shaped elements 15 are provided with an opening 20 to receive the air valve 21 of an inner tube pneumatic tire 22, which may be mounted thereon, as shown in Fig. 2. As there shown, the tire 22 is mounted upon the buffing stand for working engagement with buffing or abrading wheel 23.

For easy and efficient manipulation of the tire for positioning same against the buffing wheel, I provide a handle 24 which projects laterally outwardly from the elbow 5 in a direction opposite to that of the spindle 6 in approximately the same vertical and horizontal planes as handle 13.

To place a pneumatic tire on my novel buffing stand or jig in the position indicated in Fig. 2, it is but necessary to apply a suitable spanner wrench to the spanner locking nut 18 to remove the same from the collar 17 and off of the free end of sleeve 9 and spindle 6 over bearing 14 and screw handle 13. Thereafter, the wheel forming sections 15 may be removed in like manner. The wheel forming elements 15 may then be applied one to each side of a tube equipped pneumatic tire 22 to engage the beads thereof, and the valve 21 is placed through the aperture 20. The tire mounted wheel forming elements 15 are then slipped back onto the collar 17 and the lock nut 18 replaced and tightened. The tire is now ready for buffing or abrading.

When the tire 22 is brought into buffing or abrading contact with the rasp surface of the buffing wheel 23, braking action must be applied to the tire so that proper abrading action thereon is achieved. This braking action is accomplished by the turning of the screw cap 13 upon the threaded portion 7 of the spindle 6 to force the brake elements 8, 10, and 11 into proper braking engagement. It may be here noted that the hands of the operator are placed one each upon the handle forming screw cap 13 and the handle 24 for the purpose of guiding the peripheral surface of the tire into proper working engagement with the rasp surface of the buffing wheel 23, and braking action is applied to the tire by a very slight twisting action upon the screw cap 13. This twisting action is not sufficient to disturb the guiding action of the operator upon the tire in its relation to the buffing wheel.

I have found this apparatus particularly adaptable for use in mounting and buffing of odd-sized, relatively light-weight airplane tires, industrial tires, and the like, wherein the overall diameters of the tires and the rim sizes thereof vary greatly and thus make it uneconomical to provide expensive buffing stands or jigs therefor. My novel and inexpensive manner of forming wheel elements makes it possible to provide such wheel elements for any given size of tire at relatively small cost.

While I have disclosed a commercial form of my invention as required by Section 4888 of the United States Statutes, it should be clear that the same is subject to modification without departure from the scope of the appended claims.

What I claim is:

A tire support stand comprising an upright pedestal, a disk shaped brake element non-rotatably secured to the upper end of the pedestal with the axis of the disk at right angles thereto, an elongated spindle secured to the center of said disk and extending therefrom in a line coaxial with the disk, said spindle being threaded at the extended end, a second disk shaped brake element parallel to and closely adjacent said first mentioned stationary disk, said second disk provided with an opening coaxial with the axis of the stationary disk, an elongated sleeve secured in the opening of said second disk extending away therefrom and surrounding said spindle for rotation with respect thereto, an annular tire holder keyed to and slidably mounted on the sleeve at a point intermediate the brake element and the outer spindle end, a hand nut threaded on the outer threaded end of the spindle, an antifriction thrust bearing on the spindle interposed between the hand nut and sleeve whereby rotation of the nut moves the sleeve and tire holder longitudinally on the spindle for engagement and disengagement of said brake elements.

PAUL E. HAWKINSON.

REFERENCES CITED

The following references are of record in the file of this patent:

UNITED STATES PATENTS

| Number | Name | Date |
|---|---|---|
| 911,412 | Lang | Feb. 2, 1909 |
| 1,051,533 | Woodward | Jan. 28, 1913 |
| 1,932,302 | Browne | Oct. 24, 1933 |
| 2,197,808 | Mason | Apr. 23, 1940 |
| 2,254,526 | Hawkinson | Sept. 2, 1941 |
| 2,366,685 | Chambers | Jan. 2, 1945 |
| 2,392,667 | Hawkinson | Jan. 8, 1946 |